United States Patent [19]

Nishii et al.

[11] Patent Number: 5,179,697
[45] Date of Patent: Jan. 12, 1993

[54] SYSTEM FOR DELETING PRIORITIZED DATA STORED IN SECOND MEMORY AFTER ALL THE HAS BEEN SUCCESSFULLY TRANSFERED TO FIRST MEMORY

[75] Inventors: Toshifumi Nishii; Yukihiko Oka, both of Yamatokooriyama; Takashi Shirasaki, Nara; Kunihiro Miyamoto, Tenri, all of Japan

[73] Assignee: Sharp Kabushiki Kaisha, Osaka, Japan

[21] Appl. No.: 489,782

[22] Filed: Mar. 5, 1990

Related U.S. Application Data

[63] Continuation of Ser. No. 264,811, Oct. 31, 1988, abandoned.

[30] Foreign Application Priority Data

Oct. 31, 1987 [JP] Japan .................. 62-27683

[51] Int. Cl.⁵ .............................................. G06F 13/00
[52] U.S. Cl. ...................... 395/575; 364/260; 364/260.2; 364/964; 364/964.6; 364/DIG. 2; 364/405; 395/425
[58] Field of Search ........... 395/800, 425, 575; 364/405, 404, 401

[56] References Cited

U.S. PATENT DOCUMENTS

| Re. 33,521 | 1/1991 | Mori et al. | 364/200 |
|---|---|---|---|
| 4,075,696 | 2/1978 | Shinoda et al. | 364/404 |
| 4,159,533 | 6/1979 | Sakurai | 364/900 |
| 4,213,179 | 7/1980 | Hamano et al. | 364/900 X |
| 4,327,410 | 4/1982 | Patel et al. | 364/200 |
| 4,389,707 | 6/1983 | Tsuzuki | 364/405 |
| 4,419,738 | 11/1983 | Takahashi et al. | 364/900 |
| 4,447,887 | 5/1984 | Imazeki et al. | 364/900 |
| 4,722,054 | 1/1988 | Yosozu et al. | 364/401 |
| 4,752,910 | 6/1988 | Yen et al. | 364/900 |
| 4,757,448 | 7/1988 | Takagi | 364/405 |
| 4,815,028 | 3/1989 | Saitoh | 364/900 |
| 4,841,442 | 6/1989 | Hosoyama | 364/405 |

FOREIGN PATENT DOCUMENTS 0100140 8/1984 European Pat. Off. .
54-105944 8/1979 Japan .
58-213350 12/1983 Japan .

*Primary Examiner*—Thomas C. Lee
*Assistant Examiner*—Meng-Ai T. An

[57] ABSTRACT

A data processing device consists of a first memory and a plurality of second memories. When transferring data to the first memory from the plurality of second memories having transfer orders of the data predetermined with respect to each other, the data can be maintained in each of the second memories until the transfer of all the data stored in the second memories is completed. Therefore, even in the case where the data stored in the second memories cannot be correctly transferred to the first memory due to an occurrence of an error, the data maintained in the second memories can be saved.

3 Claims, 3 Drawing Sheets

SYSTEM FOR DELETING PRIORITIZED DATA STORED IN SECOND MEMORY AFTER ALL THE HAS BEEN SUCCESSFULLY TRANSFERED TO FIRST MEMORY

This application is a continuation of application Ser. No. 07/264,811 filed on Oct. 31, 1988, now abandoned.

BACKGROUND OF THE INVENTION

1. Field of the Invention

The present invention relates to a data processing device preferably adopted to such as an electronic cash register for processing data sent from a host computer and data entered by operating keys thereof employed in a sales management system. An electronic cash register is provided in each of branch stores and the host computer is provided in a head office which is connected to each of the branch stores through one or more on-line circuits.

2. Description of the Prior Art

FIG. 1 shows a block diagram showing an outline of a sales management system comprising electronic cash registers D1 to Dn (represented as D hereinafter) according to the prior art, wherein the electronic cash registers D2 to Dn also have the same structures as that of the electronic cash register D1.

Each of the electronic cash registers D comprises three memory means 4a, 4b and 5 for example and a key input portion 6. Such an electronic cash register D with a structure as mentioned above is provided in each of the branch stores and is connected to a host computer 12 provided in a head or central processing office through one or more on-line circuits. In such a sales management system, all of the data such as sales data of the branch stores are sent from the electronic cash registers D to the host computer 12 through a communication line. The sent data is integrally processed for cash receipt/disbursement and stock management in the host computer 12.

When data of goods such as a unit price and a division code ("division" means a minimum sorting area consisting of goods in the same category having the same price assigned) of each of the goods are sent from the host computer 12 to the electronic cash register D provided in each of the branches, the data of the goods is first entered in the memory portion 4a of a buffer. This occurs so that the unit price of the goods, for example, is not updated during the process in the electronic cash register D, i.e., during the registering operation. Moreover, data of goods can be written in the memory 4b by operating the key input portion 6 so that the unit price of the goods, for example, can be decided in each of the branches individually.

The data of goods to be entered in the memories 4a and 4b have priorities respectively defined and, for example, in case two different unit prices for the same goods are respectively stored in the memories 4a and 4b, the data stored in the memory 4a is transferred to the memory 4b in order to store the data with a higher priority in the memory 4b. Therefore each of the two kinds of data are combined. When the transfer of the data from the memory 4a to the memory 4b is completed, the memory content of the memory 4a is deleted.

Subsequently, the combined data of goods stored in the memory 4b are transferred to the memory 5. The data of goods such as a unit price and a division code of the goods are then entered in the electronic cash register D so that the processes according to the entered data are performed.

In the electronic cash register D as described above in the prior art, when a data is transferred from the memory 4b to the memory 5 for example, there may occur an error due to, for example, a lack of the capacity of the memory 5. In such a case, the data stored in the memory 4a has already been deleted and it can not be judged whether also the data stored in the memory 4b is the data written in the memory 4b by operating the key input portion 6 or the data transmitted from the host computer 12. Therefore, if such an error occurs, a part of the data is lost, resulting in a large hindrance caused in the sales management system.

SUMMARY OF THE INVENTION

An object of the present invention is to provide a data processing device which solves the problem mentioned above, preventing an undesired deletion of data and improving the operability thereof.

A data processing device according to the present invention comprises a first memory for storing data and a plurality of second memories for maintaining the data to be transferred to the first memory, wherein the order of transferring data is defined an each of the second memory means. Each of the second memories maintains the data until the transfer of the data stored in the second memories is completed.

According to the present invention, when transferring data to the first memory from a plurality of second memories having transfer orders predetermined to each other, the data can be maintained in each of the second memories until the transfer of all the data stored in the second memories is completed. Therefore, even in case the data stored in the second memories cannot be correctly transferred to the first memory due to the occurrence of an error, the data maintained in the second memories can be saved.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
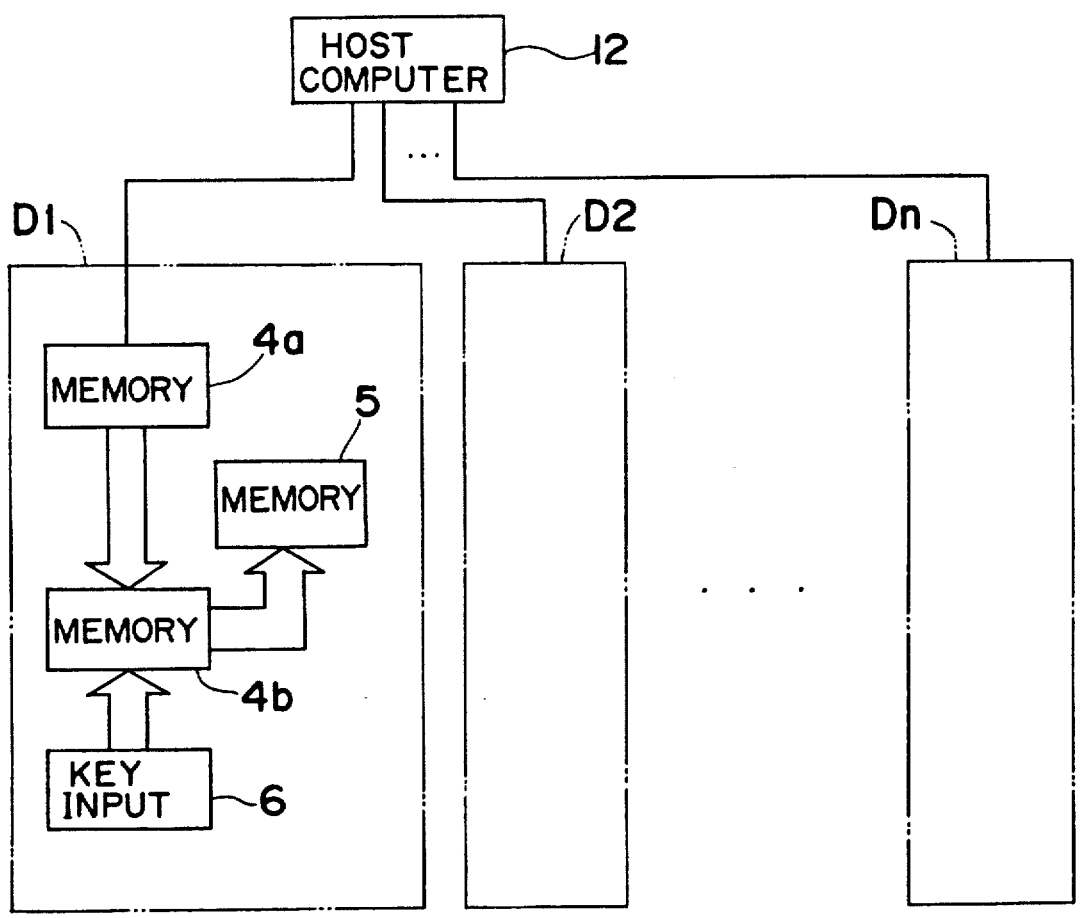
FIG. 1 is a block diagram showing an outline of an electronic cash register D in the prior art.
Figure 2:
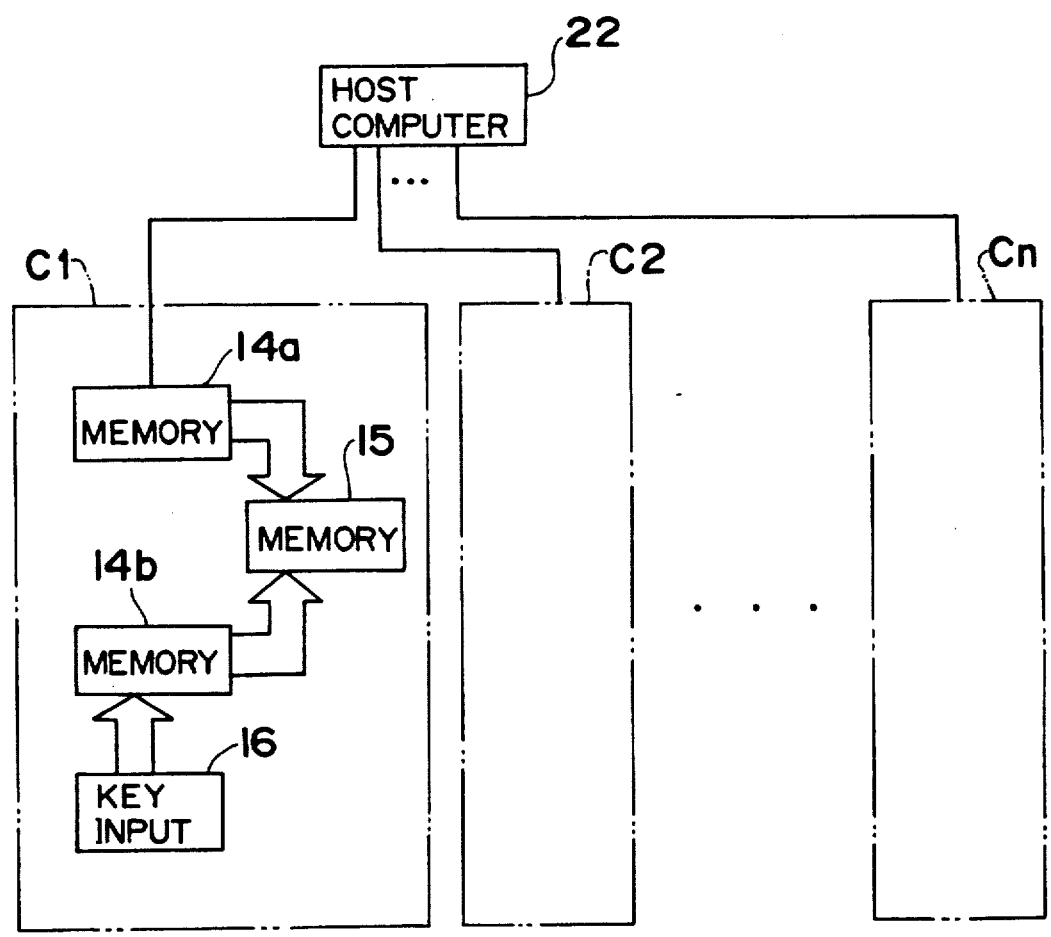
FIG. 2 is a block diagram showing an embodiment of an electronic cash register C according to the present invention.

In FIG. 2, the outlines of electronic cash registers C1 to Cn (represented as C hereinafter) are made similar to each other.

Each of the electronic cash registers C includes a first memory means 15, plural second memories 14a and 14b and a key input portion 16.

The electronic cash register C provided in each of the branch stores is connected to a host computer 22 which is provided in a head or central processing office through one or more on-line circuits. In such a sales management system, various data, such as a data of sales in each of the branch stores, is sent from the electronic cash register C to the host computer 22 so as to be integrally processed for cash receipt/disbursement and stock management.

For example, when data such as a unit price and a division code of goods is sent from the host computer 22 to the electronic cash register C in each of the branches, the data of the goods are first entered in the memory 14a which is a buffer so that the data such as a unit price of the goods is not updated during the process in the electronic cash register C. Moreover, data of the goods can be also written in the memory 14b by operating the key input portion 16 so as to determine the unit price of the goods in each of the branch stores individually.

As to the second memories 14a and 14b in which the data of goods are stored, the priority of the data transfer is predetermined by operating the key input portion 16.

The data of goods stored in the second memories 14a and 14b are transferred to the first memory 15 according to the lower priority thereof by operating keys for transferring data in the key input portion 16. When the transfer of the data both in the second memories 14a and 14b is completed, the memory contents of both of the second memories 14a and 14b are deleted.

Subsequently, the processes according to the data of goods stored in the first memory 15 are performed in the electronic cash register C.

Figure 3:
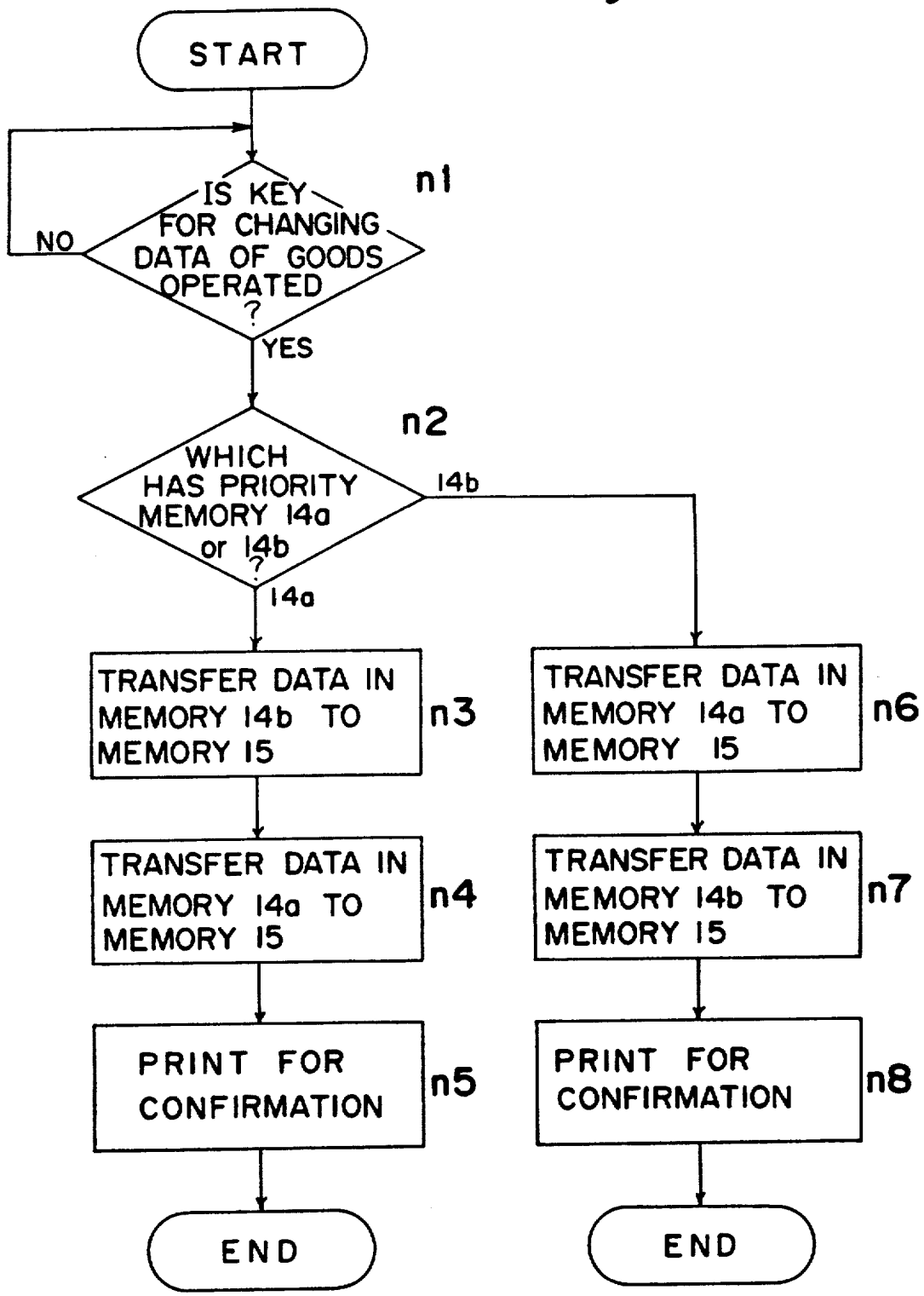
FIG. 3 is a flow chart for explaining an operation of the electronic cash register C.

Next, the operation of the electronic cash register C will be explained hereinafter with reference to the flow chart as shown in FIG. 3. In the case that the data of goods sent from the host computer 22 is stored in the second memory 14a and that the data of goods is written in the second memory 14b by operating keys in the key input portion 16, it is judged in step n1 whether or not the operation for changing the mode into a mode for updating the data of goods stored in the electronic cash register C is performed by operating the keys in the key input portion 16. In the case of performing the operation for changing the mode, the program goes to step n2.

It is judged in step n2 which of the data is of higher priority, the data stored in the second memory 14a or the data stored in the second memory 14b. In the case of giving the higher priority to the data stored in the second memory 14a, the program goes to step n3 and the data stored in the second memory 14b are transferred to the first memory 15.

Next in step n4, the data stored in the second memory 14a are transferred to the first memory 15 and when the transfer of the data is completed, the data stored in both of the second memories 14a and 14b are deleted.

Accordingly, in the case where two different unit prices of the same goods are respectively stored in the second memories 14a and 14b, though the data of the unit price stored in the second memory 14b are first transferred to the first memory 15, since the data of the unit price of the goods stored in the second memory 14a are duplicatedly written in the first memory 15, the data stored in the second memory 14a are stored with priority in the first memory 15.

In this way, when the change of the data of goods stored in the first memory 15 is completed in the electronic cash register C, the data of goods are printed for confirmation in step n5.

In case of giving priority to the data stored in the second memory 14b in step n2, the program goes to step n6 and the data stored in the second memory 14a are first transferred to the first memory 15.

Next in step n7, the data stored in the second memory 14b are transferred to the first memory 15, contrary to that mentioned above. Therefore, the data stored in the second memory 14b are stored in the first memory 15 with priority.

As described above, when the change of the data of goods stored in the first memory 15 is completed, the data stored in both of the second memories 14a and 14b are deleted and next, in step n8, the data of goods are printed for confirmation.

In the electronic cash register C as described above, for example, in the case where an error occurs due to the lack of the capacity of the first memory 15, for example in the process of transferring the data from the second memory 14a to the first memory 15 such that the data cannot be correctly transferred to the first memory 15, the data stored in the second memories 14a and 14b are not deleted and are maintained. Therefore, the contents of the data stored in the second memories 14a and 14b remain and if necessary, the contents of the data stored in the second memory 14b can be re-written and the re-written data can be once more transferred to the first memory 15.

In this embodiment, although the second memory includes two memory portions 14a and 14b, the second memory may include three or more memory portions.

As described above, according to the present invention, in the case that the data is transferred to the first memory from a plurality of second memories, of which the orders of the transfer of the data are predetermined with respect to each other, when the transfer of the data is not correctly performed due to the occurrence of an error, the data stored in each of the second memories are not deleted and are maintained. Accordingly, in such a case, the cause of the error, for example, can be caught with reference to the data stored in each of the second memories, whereby the operability can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sales management system comprising:
   a host computer for setting temporary data;
   key input means for setting temporary data; and
   a plurality of electronic cash registers, operatively communicative with said host computer and said key input means, each of said electronic cash registers including,
   first memory means for storing prioritized data,
   a plurality of second memory means, operatively communicative with said first memory means, for receiving the temporary data from said host computer and said key input means and temporarily storing the temporary data to be transferred to said first memory means, and each of said plurality of second memory means being designated with a unique order of priority by which said temporary data is to be transferred to said first memory means as the prioritized data, and
   control means, operatively communicative with each of said plurality of second memory means, for controlling the transfer of said temporary data from said plurality of second memory means to said first memory means from lowest to highest priority as designated by said unique order of priority for each of said plurality of second memory means, and for deleting said temporary data stored in each of said plurality of second memory means when the entirety of said temporary data stored in the highest priority second memory means has been transferred to said first memory means.

2. A method of hierarchal data transfer in a sales management system including a plurality of electronic cash registers, comprising the steps of:

setting temporary data by a host computer and key input means which are operatively communicative with said plurality of electronic cash registers;

temporarily storing the temporary data, which has been transferred from said host computer and said key input means, in at least one of a plurality of secondary memory means of one of said electronic cash registers;

designating a unique priority for each of said plurality of secondary memory means from a lowest to a highest priority;

sequentially transferring the entirety of said temporary data from each of said plurality of secondary memory means, in an order from said lowest to highest priority as designated by said unique priority for each of said plurality of secondary memory means, to primary memory means of said electronic cash register; and deleting said temporary data from said plurality of secondary memory means when the step of sequentially transferring the entirety of said temporary data from said secondary memory means having the highest priority to said primary memory means of said electronic cash register has been completed.

3. A method as claimed in claim 2, further comprising the step of:

maintaining said temporary data in said plurality of secondary memory means when said temporary data from at least one of said secondary memory means fails to be transferred to said primary memory means of said electronic cash register.

* * * * *

UNITED STATES PATENT AND TRADEMARK OFFICE
CERTIFICATE OF CORRECTION

PATENT NO. : 5,179,697

DATED : January 12, 1993

INVENTOR(S) : Toshifumi NISHII, Takashi SHIRASAKI & Yukihiko OKA

It is certified that error appears in the above-identified patent and that said Letters Patent is hereby corrected as shown below:

On the title page:
    Please change "62-27683" to --62-276283--
column 1, line 19 at item (30).

Signed and Sealed this

Thirteenth Day of April, 1993

*Attest:*

STEPHEN G. KUNIN

*Attesting Officer*   *Acting Commissioner of Patents and Trademarks*